June 23, 1953    H. A. WAGNER    2,642,681
FRONT APRON ADJUSTING MECHANISM FOR CARRY-TYPE SCRAPERS
Filed July 14, 1948    3 Sheets-Sheet 3

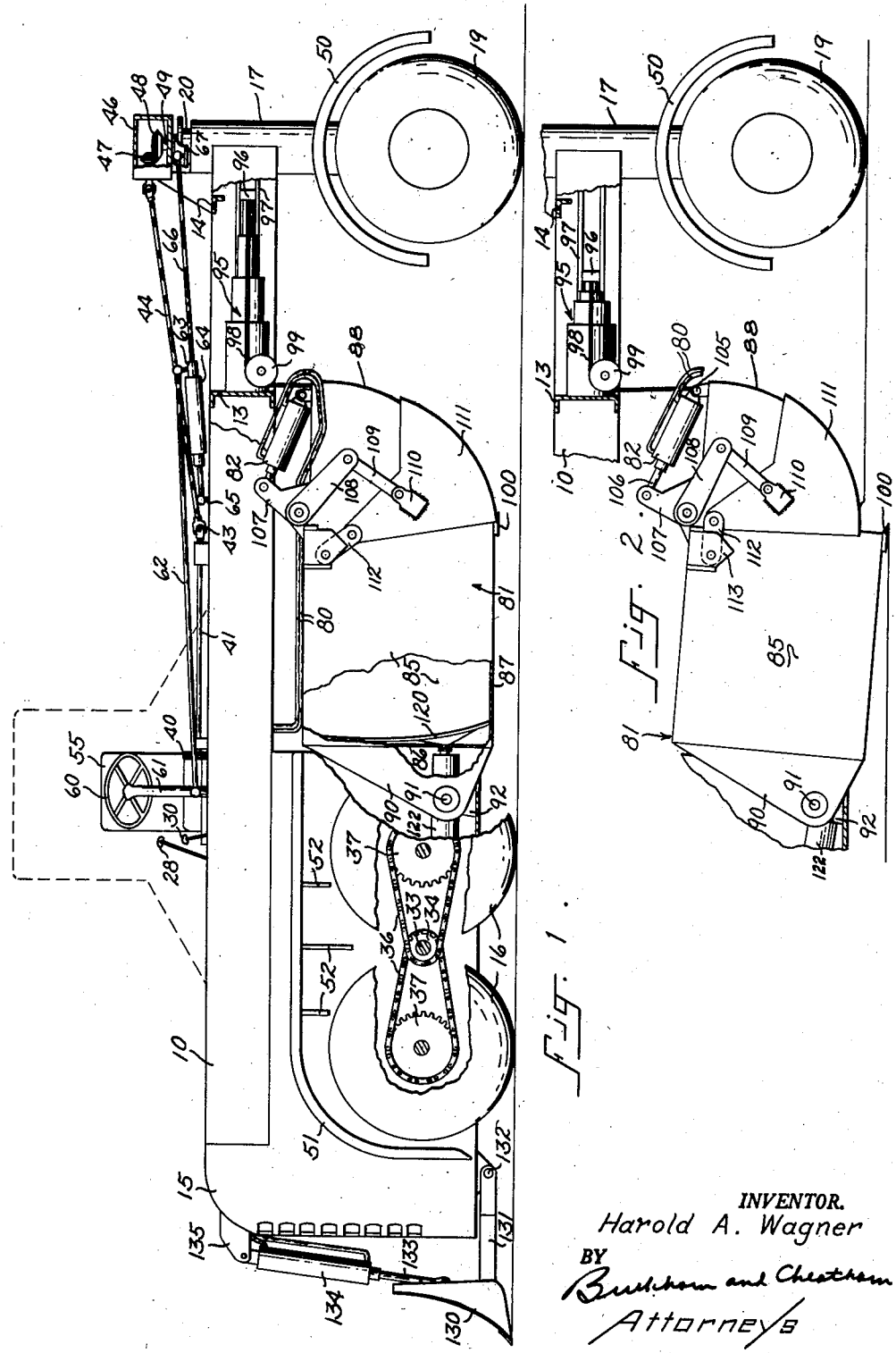

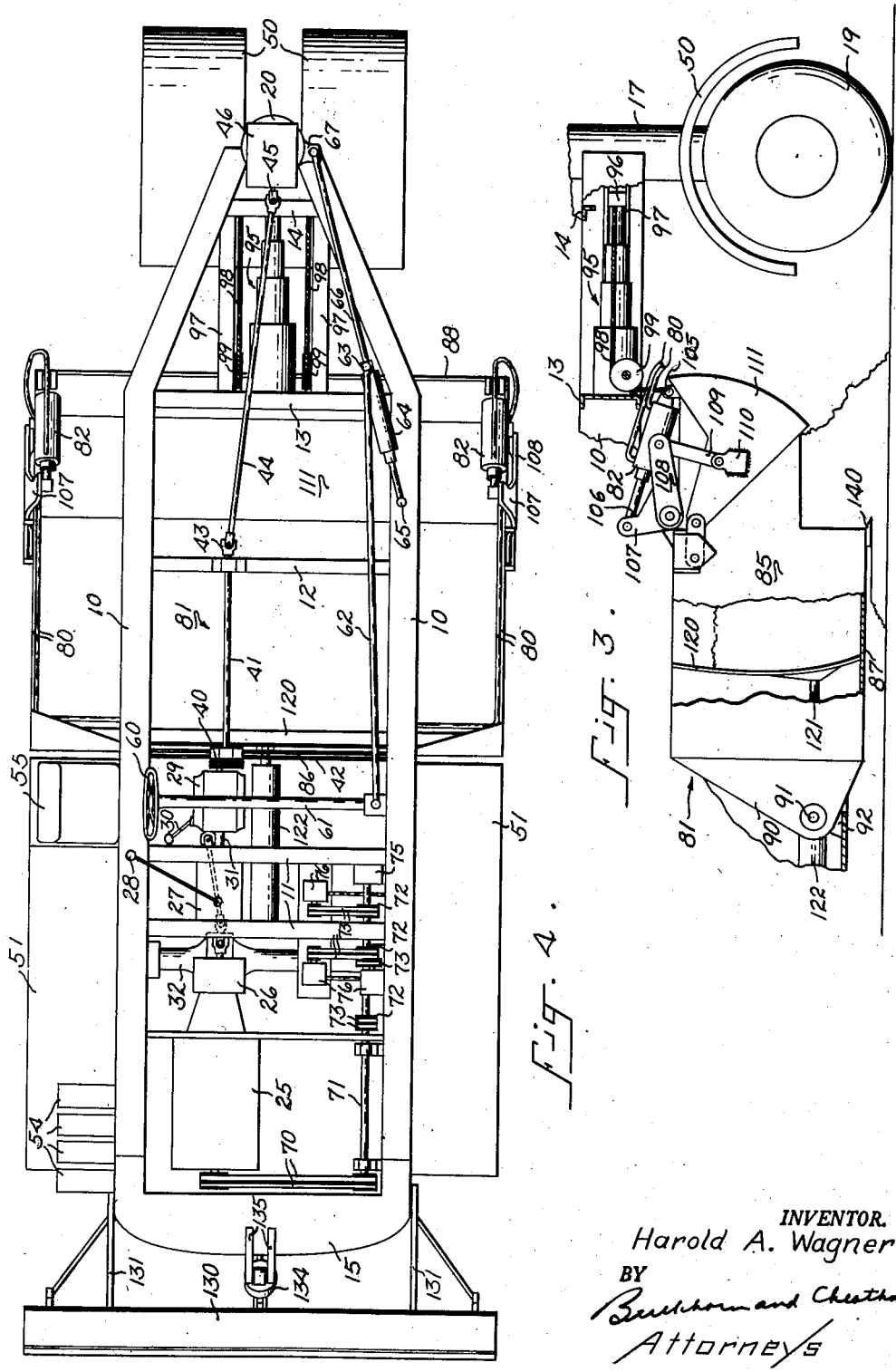

INVENTOR.
Harold A. Wagner
BY
Burkham and Cheatham
Attorneys

Patented June 23, 1953

2,642,681

UNITED STATES PATENT OFFICE 2,642,681

FRONT APRON ADJUSTING MECHANISM FOR CARRY-TYPE SCRAPERS

Harold A. Wagner, Portland, Oreg.

Application July 14, 1948, Serial No. 38,643

2 Claims. (Cl. 37—126)

1

The present invention relates to earth moving apparatus of the scraper bucket type. The object of the present invention is to provide a self-propelled vehicle capable of leveling ground by scraping excess earth from high points and spreading it at low points, which vehicle comprises a number of advantages over prior devices of the same general type. The principal object of the present invention is to provide a vehicle in which the earth scraping and moving device is combined with the traction device as distinguished from prior art mechanism in which a separate wheeled scraper or earth mover is attached to a separate traction device.

A further object of the present invention is to provide a vehicle of the foregoing type which is sturdy and simple in its operation and requires a minimum of moving parts, since most of the operations are performed by hydraulic motors, hence the necessity for long, heavy operating levers, cranks, booms, and the like, is eliminated.

A further object of the present invention is to provide a vehicle of the foregoing type which may be driven in either direction with equal facility, since the driver's seat and the controls are so located as to provide unobstructed view either ahead of or behind the vehicle, thus greatly increasing the utility of the vehicle.

A further object of the present invention is to provide a vehicle of the foregoing type which may operate in one direction as a scraper and earth remover and in the other direction as a bulldozer. Coupled with the foregoing objects is the provision of a bulldozer scraper blade which may be lowered as the earth conveying bucket is being emptied so that the earth being deposited may be smoothly spread over the surface of the ground.

A further object of the present invention is to provide earth leveling equipment having its wheels of such size and so arranged, and the equipment being of such great weight, especially when loaded, that the vehicle acts as a compacting mechanism while operating as an earth leveler or mover, thus eliminating the necessity for separate tamping mechanism such as the conventional sheep's-foot roller.

A further object of the present invention is to provide a machine of the foregoing type which may be made in tremendous sizes, for example, a model in use at present comprises a bucket of eleven and one-half cubic yards capacity, thus permitting the rapid accomplishment of major operations.

A further object of the present invention is to

2 provide a machine of the foregoing type in which the operator's view of the interior of the earth scraping bucket is unobstructed so that the most economical operation is assured, since no partial loads will be transported.

A further object of the present invention is to provide a machine of the foregoing type in which all operating mechanisms are easily accessible.

A further object of the present invention is to provide an earth scraping and moving bucket of novel and improved characteristics.

The foregoing and further objects and advantages of the present invention may be more readily ascertained from inspection of the following specification taken in connection with the accompanying drawings wherein like numerals refer to like parts throughout, while the features of novelty will be more distinctly pointed out in the appended claims.

In the drawings Fig. 1 is a side elevation of the machine with portions broken away to illustrate interior details;

Fig. 2 is a partial view of the machine taken from the side thereof and showing the bucket in the act of scraping earth;

Fig. 3 is a view similar to Fig. 2 showing the bucket in the act of depositing earth;

Fig. 4 is a plan view of the machine;

Figure 6:
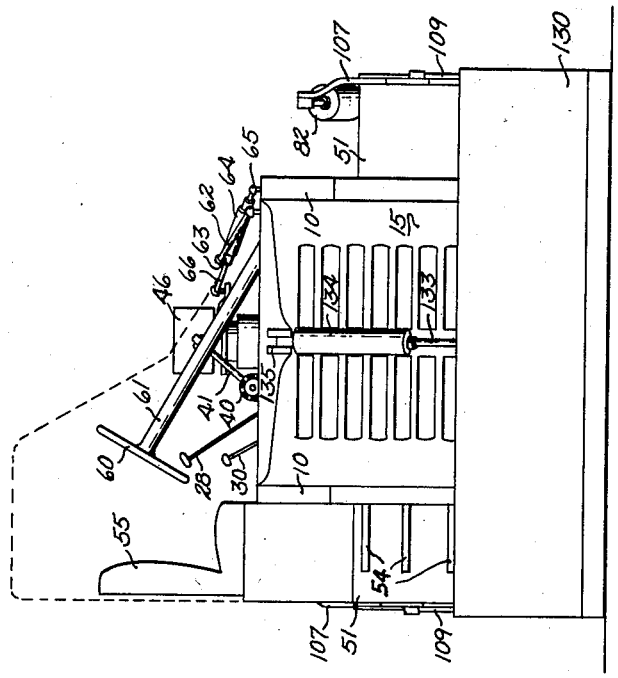
Fig. 6 is a rear view of the machine.
Figure 5:
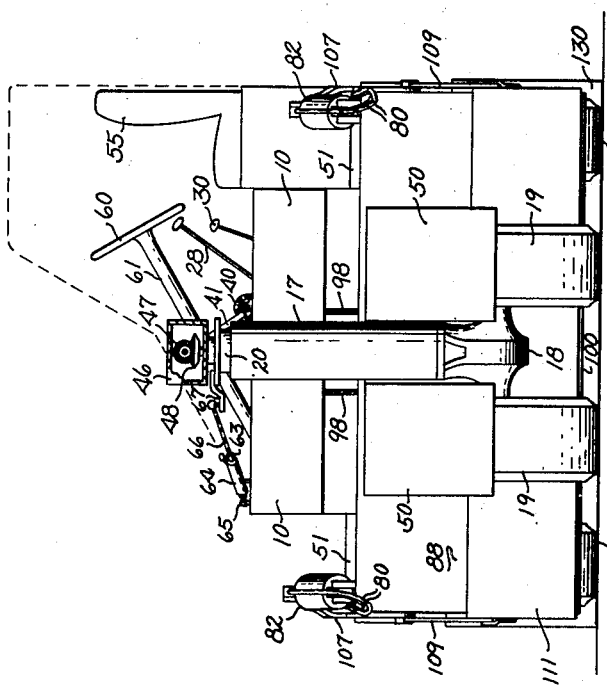
Fig. 5 is a front view of the machine.

The machine in its preferred form comprises a pair of longitudinally extending beams 10 of great strength and rigidity, the beams being parallel throughout their greatest extent and being bent toward each other adjacent the front ends thereof. The beams are suitably connected by crossbeams 11, 12 and 13 at intermediate points thereof, and are joined at their front ends by an angle bar 14. The rear ends of the beams are connected by a formed plate 15 providing a grill and protecting covering for the engine cooling radiator (not shown). The ends of plate 15 extend forwardly beneath each of the beams 10 to a point beneath the center of the machine to provide vertical engine housing walls, the plate being of considerable thickness, strength and rigidity to provide supporting means for a pair of close coupled rear driving wheels 16 at each side of the frame. The front ends of the beams 10 are fastened to a tiller post journal 17 beneath which is mounted a differential housing 18 supporting a closely spaced pair of front wheels 19. As seen in Fig. 5, the wheels 19 are positioned in line with the spaces between the wheels 16 so that the front wheels compact earth between the lines of earth compacted by the rear wheels 16. The tiller journal 17 supports a rotatable sleeve 20 to which the differential housing 18 is attached. The sleeve 20 may be partially rotated by steering mechanism to be described later so that the wheels 19 may pivot about the tiller journal 17 to steer the vehicle from place to place.

An internal combustion engine 25 is mounted in the engine compartment near the rear end of the machine. The driving shaft of the engine projects forwardly through a first gear box 26. The first gear box is connected to a second gear box 27 from which projects a transmission lever 28. The second gear box is connected to a third gear box 29 from which projects a second transmission lever 30. The gear box 29 is connected to a forwardly projecting shaft 31 which extends into a differential housing 32 having lateral extensions supporting drive shafts 33 projecting through the side plates of the engine housing. Each shaft 33 supports a pair of closely spaced sprocket gears 34 driving a pair of chains 36, each of which extends about a gear 37 on the short shafts of the wheels 16. Each of the wheels is therefore power-driven and the speed at which they are driven, as well as the direction thereof, is controlled by selecting various combinations of gears through the transmission levers 28 and 30. A forward extension of the power takeoff shaft 31 is connected through suitable sprocket gears and a sprocket chain 40 to a forwardly extending shaft 41 which is mounted upon the cross brace 12 and a heavy plate 42 forming the forward end of the engine compartment. The shaft 4 is connected through a universal joint 43 to an extension 44 having connection with a universal joint 45 adjacent the tiller journal 17. A short stub shaft is connected to the universal joint 45 and extends into a gear box 46 located above the tiller journal and has a driving pinion 47 thereon. The pinion 47 meshes with a gear 48 connected to a vertical shaft 49 extending downward through the hollow interior of the tiller post 20. The shaft 49 is connected to the differential in housing 18 and thereby drives the front wheels 19 at the same speed and with the same power ratio as the rear wheels 16.

Fenders 50 are preferably positioned over each front wheel 19, and fenders 51 are positioned over the rear wheels 16 and suitably braced as by means of brackets 52 so as to provide catwalks at each side of the engine compartment. At least one of the fenders 51 supports a plurality of steps 54 by means of which the operator may mount the machine.

The forward end of one of the fenders 51 provides a support for a driver's seat 55 which is so positioned that the driver faces in a direction transversely of the direction of movement of the vehicle. The driver is centrally positioned so that he may look into the engine compartment provided suitable engine protecting plates (not shown) are in elevated position, and he may also look down into the earth scraping and moving bucket which is positioned forwardly of the plate 42. Suitable supports for the driver's feet may be positioned in the space between the cross braces 11 and the plate 42. A cab, indicated in dotted outline, may be provided to protect the driver from the weather. Suitable gear shift pedals and other controls may be mounted within the cab within reach of the driver, such controls not being illustrated since many different types may be provided.

A steering wheel 60 is provided adjacent the driver's seat, being supported on a steering wheel post 61 extending diagonally downward across the machine to the opposite side beam 10. The steering wheel is suitably connected to a longitudinally movable rod 62 which extends forward alongside and above the beam 10 and is suitably connected to a valve 63 having a neutral and opposed direction of flow positions. The valve 63 controls the admission of fluid in one or the other direction through suitable connections (not shown) into a cylinder 64, pivotally mounted at 65 on top of the beam 10. A piston within the cylinder 64 is moved in either direction to extend or retract a piston rod 66 pivotally connected to a lever 67 fastened to the top of the tiller post 20. Slight and effortless movement of the steering wheel 60 therefore controls powered movement of the front wheels 19.

The engine 25 is connected through pulleys and belts 70 to a longitudinally extending shaft 71 having a plurality of driven pulleys 72 mounted thereon. The pulleys 72 are connected by suitable belts 73 and driven pulleys to a plurality of accessory mechanisms such as a generator for ignition and lighting purposes, and air compressors if the fluid power is supplied by compressed air, or pumps if the fluid power is supplied by forcing a liquid through various conduits to move various operating pistons such as the piston 64. In the present illustration, shaft 71 directly drives a pump 75 and the belts 73 drive other pumps 76, each of which supplies fluid under pressure to a certain operating cylinder. It is to be appreciated that a single large pump may be substituted for the plurality of smaller pumps herein ilustrated, the illustration being merely exemplary of means for creating fluid pressure. Suitable conduits for the fluid pressure may extend along the beams 10 and may be otherwise supported on the supporting structure to connect with the various operating cylinders. For example, pipes 80 are shown as extending along the top of the side edges of the earth scraping and moving bucket 81 in order to reach cylinders 82 mounted at the forward corners of the bucket. The details of the fluid circulating system and the valves for controlling the flow of fluid from and to the pumps are not herein illustrated, since such details are immaterial and may be varied to suit the design engineer or to accommodate material on hand.

The earth moving bucket 81 extends from the driver's compartment to a position rearwardly of the front wheels 19, the bucket being of greater width than the distance between the pairs of wheels 16 so that the earth being worked upon will be compacted by the front wheels 19 and the rear wheels 16. Thus, if the operator is scraping excess loose earth he will not scrape too deeply, since the earth will be compacted as he moves the vehicle about; and, similarly, he will not pile too much or too little in a new position, since the tremendous weight of the machine will cause the deposited earth to be compacted as the vehicle moves about.

The bucket 81 comprises side walls 85, a rear wall 86, a bottom wall 87, and a curved, partial front wall 88 which extends partially downward toward the bottom wall 87. The rear wall 86 is provided with a pair of brackets 90 located beneath the beams 10 which extend into the bottom of the engine compartment and are pivotally connected by a cross shaft 91 to brackets 92 located in the bottom of the engine compartment so that the forward end of the bucket may be raised or lowered as desired. The raising and lowering is accomplished by a nest of telescoping cylinders 95 mounted on the front surface of the crossbeam 13 and centrally thereof. The forward section of the cylinder nest 95 is provided with a crosshead 96, the tips of which are suitably guided in channels 97. A pair of cables 98 extend rearwardly from the ends of crosshead 96 over a pair of guiding pulleys 99 mounted at the rear of the channels 97 and downwardly to the upper edge of the front wall 88. Extension of the piston nest 95 causes the bucket to be raised, as seen in Fig. 1, and retraction thereof causes it to be lowered, as seen in Fig. 2. When the bucket is lowered, a scraper blade 100 extending along the front edge of the lower wall 87 engages the ground to scrape up earth to the extent desired by the operator within the limits of the machine.

The cylinders 82 are pivotally mounted at 105 on the front corners of the bucket, and pistons 106 extending therefrom are pivotally connected to cranks 107 fastened to levers 108 extending forwardly from pivots mounted on the side walls 85 directly above the scraper blade 100. The levers 108 are pivotally connected to links 109 pivotally fastened to brackets 110 on the side walls of an arcuate gate 111 adapted to bridge the gap between the lower edge of wall 88 and the scraper blade 100. The gate 111 is pivotally connected to short links 112 pivotally fastened in guard brackets 113 mounted at the upper corners of the side walls 85. When the piston 106 is retracted, as seen in Fig. 1, the links 112 extend diagonally downward and the gate 111 closes the gap in the front wall of the bucket. When the pistons 106 are extended to a partial extent, as seen in Fig. 2, the gate 111 is lifted almost vertically so as to leave a gap above the scraper blade 100, but most of the gap in the bucket will be closed by the arcuate portion of the gate 111. Therefore, earth which is being scraped into the bucket may first fill the portion of the bucket above the bottom wall 87 and will then fall forwardly to fill the space above the gate 111, thus causing the entire bucket to be filled at each operation. The gate 111 may be lowered as the scraper blade 100 is being raised, so that the entire load will be trapped within the bucket. When the bucket is being used to engage a loose pile of earth or is being used to spread earth from the bucket onto the ground, the gate may be completely opened, as seen in Fig. 3, by continued extension of piston 106. The movement of the gate is therefore first a vertical movement until the links 112 reach their horizontal, limited position as seen in Fig. 2, and then a swinging movement to the position seen in Fig. 3.

In order to limit the extent to which the bucket may be filled, and in order to completely empty the bucket when earth is being deposited, a false rear wall or ejector 120 is mounted inside of the bucket just ahead of the rear wall 86. The ejector is fastened to a piston 121 extending through a slot in the rear wall 86 into a cylinder 122 which is pivotally mounted at its rear end within the engine compartment. The piston rod 121 is extended or retracted as desired under suitable controls connected with the fluid pressure creating system.

In order to operate the machine as a bulldozer or to cause the deposited earth to be thinly spread, and to cause the ridges of earth left between the ruts formed by the wheels to be spread into the ruts, a scraper blade 130 is mounted on the rear end of the machine. The lower edge of the blade is pivotally fastened to supporting brackets 131 pivoted at 132 beneath the rear end of the engine compartment. An intermediate portion of the blade is pivotally connected to a piston rod 133 extending into a cylinder 134 which is pivoted on a central bracket 135 at the top of the engine compartment. The cylinder is suitably connected to the source of fluid so that the blade may be raised or lowered to the extent desired by the operator.

It will be apparent from the foregoing that a plurality of combinations of operations may be performed at the same time, since each operation may be independently controlled. The gate 111 may be moved vertically and/or swung arcuately independently of the position of the scraper bucket 81. The scraper bucket may be raised or lowered before, during, or after any movement of the gate. The ejector 120 may be moved forwardly or rearwardly before, during or after any of the preceding operations; and the position of the bulldozer scraper blade 130 may be controlled entirely independently of any of the other operations. There are no long, heavy booms or supporting levers for any portion of the mechanism. The size of the machine is limitless, being controlled entirely by the desires of the builder, since any horsepower motor and any size of wheels may be utilized. The machine may be moved at any speed from a few feet per minute to high speeds of forty and fifty miles per hour for transportation along highways. Extreme versatility is provided by arranging the driver's cab and the steering mechanism and controls centrally so as to provide clear visibility in either direction. An important feature of the invention is that the vehicle comprises a forwardly opening scraper bucket, the bucket and the opening therein being as wide as the distance between the outer surfaces of the rear wheels, and a vertically adjustable scraper blade as wide as the bucket mounted behind the rear wheels, so that the rear wheels may compact the edges of fills and the scraper blade will then fill the compacted ruts. Another important feature is that the front wheels are positioned between the rear wheels for the same general reasons.

Features of similarity between the present invention and a prior invention concerning the same subject may be claimed in my copending application, Serial No. 540,914, filed June 19, 1944, now Patent No. 2,516,816, issued July 25, 1950.

Having illustrated and described a preferred embodiment of the invention, it should be apparent to those skilled in the art that the invention permits of modification in detail and arrangement. All such modifications as come within the true spirit and scope of the appended claims are considered to be a part of the invention.

I claim:

1. An earth scraping and moving vehicle comprising a frame, an earth scraping bucket pivotally mounted on said frame toward the rear of the bucket, means mounted on said frame for raising and lowering the front end of said bucket with respect to the ground, said bucket including a bottom wall having a scraper blade at its forward edge, a pair of side walls joining said bottom wall and including upper portions extending forwardly beyond said scraper blade in vertically spaced relation thereto, and a front wall joining the forward edges of said upper portions, there being a gap in the front of said scraper bucket defined in part by vertical edges of said side walls immediately adjacent said scraper blade, a gate including an arcuate, upwardly directed front portion and side portions parallel to said side walls, said bottom wall of the bucket being disposed substantially tangentially with respect to the front portion of said gate when the gate is lowered, a first pair of links inclined forwardly and connecting the upper, rear corners of the side portions of said gate to said side walls above said scraper blade when said gate is in the closed position, a pair of levers mounted on said side walls and extending forwardly above the side portions of said gate, a second pair of links inclined rearwardly and connecting said levers to the side portions of said gate, motive means mounted on said bucket for actuating said levers to raise said gate, said links swinging to permit vertical, linear movement of said gate upon initial movement of said levers adjustably to define a narrow slot above said scraper blade, and means limiting movement of said first links whereby continued actuation of said levers causes said second links to swing said gate arcuately about the front wall of said bucket.

2. An earth scraping and moving vehicle comprising a frame, an earth scraping bucket pivotally mounted on said frame toward the rear of the bucket, means mounted on said frame for raising and lowering the front end of said bucket with respect to the ground, said bucket including a bottom wall having a scraper blade at its forward edge, a pair of side walls joining said bottom wall and including upper portions extending forwardly beyond said scraper blade in vertically spaced relation thereto, and a front wall joining the forward edges of said upper portions, there being a gap in the front of said scraper bucket defined in part by vertical edges of said side walls immediately adjacent said scraper blade, a gate including an arcuate, upwardly directed front portion and side portions parallel to said side walls, said bottom wall of the bucket being disposed substantially tangentially with respect to the front portion of said gate when the gate is lowered, means including a plurality of links connecting the side portions of said gate to the side walls of said bucket, motive means mounted on said bucket for actuating said links to raise said gate, said links permitting vertical, linear movement of said gate upon initial movement of said motive means adjustably to define a narrow slot above said scraper blade, and means limiting movement of certain of said links whereby continued actuation of said motive means causes others of said links to swing said gate arcuately about the front wall of said bucket.

HAROLD A. WAGNER.

References Cited in the file of this patent

UNITED STATES PATENTS

| Number | Name | Date |
|---|---|---|
| 2,275,601 | Austin et al. | Mar. 10, 1942 |
| 2,303,650 | Low | Dec. 1, 1942 |
| 2,304,786 | Armington et al. | Dec. 15, 1942 |
| 2,317,511 | Barrett | Apr. 27, 1943 |
| 2,320,625 | Low | June 1, 1943 |
| 2,422,813 | Walch | June 24, 1947 |
| 2,460,764 | Oklejas | Feb. 1, 1949 |
| 2,516,816 | Wagner et al. | July 25, 1950 |